United States Patent
Pope et al.

(10) Patent No.: US 10,713,392 B2
(45) Date of Patent: *Jul. 14, 2020

(54) NETWORK INTERFACE DEVICE AND METHOD

(71) Applicant: XILINX, INC., San Jose, CA (US)

(72) Inventors: Steven L. Pope, Cambridge (GB); David J. Riddoch, Huntingdon (GB); Paul Fox, Cambridge (GB)

(73) Assignee: XILINX, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/147,164

(22) Filed: Sep. 28, 2018

(65) Prior Publication Data

US 2019/0102576 A1 Apr. 4, 2019

Related U.S. Application Data

(63) Continuation-in-part of application No. 15/721,619, filed on Sep. 29, 2017.

(51) Int. Cl.
| | |
|---|---|
| *H04L 9/32* | (2006.01) |
| *G06F 21/72* | (2013.01) |
| *G06F 21/60* | (2013.01) |
| *H04L 9/08* | (2006.01) |
| *H04L 9/06* | (2006.01) |
| *G06F 21/57* | (2013.01) |

(52) U.S. Cl.
CPC .............. *G06F 21/72* (2013.01); *G06F 21/57* (2013.01); *G06F 21/602* (2013.01); *H04L 9/0643* (2013.01); *H04L 9/0819* (2013.01)

(58) Field of Classification Search
USPC .......................................................... 713/189
See application file for complete search history.

(56) References Cited

U.S. PATENT DOCUMENTS

| | | | |
|---|---|---|---|
| 7,249,215 | B2 | 7/2007 | Surico et al. |
| 7,352,734 | B2 | 4/2008 | Zaitsu |
| 7,545,928 | B1 | 6/2009 | Goh |
| 7,580,519 | B1 | 8/2009 | Goh |
| 7,634,481 | B2 | 12/2009 | Harada et al. |
| 9,720,797 | B2 | 8/2017 | Broderick et al. |
| 9,886,409 | B2 | 2/2018 | Keckler et al. |
| 9,934,022 | B2 | 4/2018 | Marr et al. |
| 9,961,081 | B2 | 5/2018 | Zayed |
| 2013/0016279 | A1 | 1/2013 | Silverbrook |
| 2013/0156195 | A1 | 6/2013 | Lee et al. |

(Continued)

FOREIGN PATENT DOCUMENTS

| | | |
|---|---|---|
| EP | 2288077 A1 | 2/2011 |

OTHER PUBLICATIONS

EP 18197506.1-1218—Extended European Search Report dated Jan. 25, 2019, 9 pages.

(Continued)

*Primary Examiner* — Amare F Tabor
(74) *Attorney, Agent, or Firm* — Haynes Beffel & Wolfeld, LLP; Andrew L. Dunlap; Paul A. Durdik

(57) ABSTRACT

A network interface device comprises an integrated circuit device comprises at least one processor. A network interface device comprises a memory. The integrated device is configured to execute a function with respect to at least a part of stored data in said memory.

34 Claims, 6 Drawing Sheets

(56) References Cited

U.S. PATENT DOCUMENTS

2016/0019050 A1   1/2016  Marr et al.
2016/0359636 A1   12/2016 Kreft
2018/0373428 A1*  12/2018 Kan .................... G06F 3/0679
2019/0102576 A1*  4/2019  Pope ................... H04L 9/0643

OTHER PUBLICATIONS

U.S. Appl. No. 15/721,619—Office Action dated Aug. 2, 2019, 17 pages.

* cited by examiner

NETWORK INTERFACE DEVICE AND METHOD

CROSS REFERENCE AND RELATED APPLICATION

This application is a continuation-in-part of U.S. application Ser. No. 15/721,619, entitled "NETWORK INTERFACE DEVICE AND METHOD" by Steven L. Pope, David J. Riddoch, and Paul Fox, filed 29 Sep. 2017, which application is incorporated herein by reference in its entirety.

BACKGROUND OF THE INVENTION

Field

Some embodiments relate to a network interface device and a method.

Background

Network interface devices, sometimes referred to as NICs are provided in devices to allow the devices to output and/or receive data, often in the form of packets.

The complexity of processing on some NICs has increased substantially to the point where entire applications may be executed on the NIC. Complex operations such as capture, flow steering, telemetry, firewalling are being deployed on NICs.

Regardless of the complexity or otherwise of operations performed by a NIC, it is desired that the NIC be configured to only execute the firmware or computer code which is intended.

SUMMARY

According to an aspect, there is provided a network interface device comprising: an integrated circuit device comprising at least one processor and a data store configured to store a first encryption key; and a memory external to said integrated circuit device, wherein said at least one processor is configured to encrypt data to be stored in said memory using said first encryption key.

The data store may be provided by a memory in said integrated circuit device.

The data store may be a fuse data store.

The integrated circuit device is such that debug access is unavailable.

The integrated circuit device may be such that at least some computer code executing on said at least one processor is unable to access said first encryption key.

The integrated circuit device may comprise at least one of an ASIC, an FPGA, an integrated circuit and an integrated circuit die.

A second key may be provided in said network interface device, said second key being a private key associated with said network interface device.

The second key may be stored in one of said data store, a memory internal to said integrated device and the memory external to said integrated device.

The network interface device may be configured to receive a nonce, the integrated device is configured to encrypt the nonce with said second key and output said encrypted nonce.

The integrated device may be configured to execute a function with respect to at least a part of stored data, wherein said stored data is stored in one or more of said memory external to said integrated circuit device and memory on said integrated device.

The function may comprise a hash function.

An output of said function may be such that a size of said output of said function together with a size of said stored data is greater than a size of available memory for storing data.

An output of said function may have a size greater than a size of available memory for storing data.

An output of said function may be dependent on the content of said at least a part of said store data.

The integrated circuit device may be configured to receive information identifying a location of stored data and use said information to execute said function.

The information identifying a location may comprise index information.

The integrated circuit device may be configured to output a result of said function.

According to another aspect, there is provided a network interface device comprising: an integrated circuit device comprising at least one processor and a first memory; and a second memory external to said integrated circuit device, wherein said integrated circuit device is configured to execute a function with respect to at least a part of stored data, wherein said stored data is stored in one or more of said first memory and second memory on said integrated device.

According to another aspect, there is provided an network interface device comprising: an integrated circuit device comprising at least one processor, and a memory, wherein said integrated device is configured to execute a function with respect to at least a part of stored data in said memory It should be appreciated that in other aspects, embodiments may be provided in devices other than network interface devices.

The memory may comprise a first memory in said integrated circuit and a second memory external to said integrated circuit device, wherein said stored data is stored in one or more of said first memory and second memory.

The function may comprise a hash function.

An output of said function may be such that a size of said output of said function together with a size of said stored data is greater than a size of available memory for storing data.

An output of said function is such that said function may be calculated by said processor using the stored data. For example, the output of the function cannot be looked up by reference in a table which is contained within the store.

An output of said function may have a size greater than a size of available memory for storing data.

An output of said function may be dependent on the content of said at least a part of said stored data.

The integrated circuit device may be configured to receive information identifying a location of stored data and use said information to execute said function with respect to said stored data at said location.

The information identifying a location may comprise index information.

The integrated circuit device may be configured to output a result of said function.

The network interface device may comprise in said integrated circuit device a data store configured to store a first encryption key, said at least one processor is configured to encrypt data to be stored in said second memory using said first encryption key.

The data store may be provided by said first memory.

The data store may be a fuse data store.

The integrated circuit device may be such that debug access is unavailable.

The integrated circuit device may be such that at least some computer code executing on said at least one processor is unable to access said first encryption key.

The integrated circuit device may comprise at least one of an ASIC, an FPGA, an integrated circuit and an integrated circuit die.

A second key may be provided in said network interface device, said second key being a private key associated with said network interface device.

The second key may be stored in one of said data store, the first memory and the second memory.

The network interface device may be configured to receive a nonce, the integrated device is configured to encrypt the nonce with said second key and output said encrypted nonce.

According to another aspect, there is provided a method comprising: using a key stored in a data store in an integrated circuit device in a network interface to encrypt data to be stored in a memory in said network interface device external to said integrated circuit device; and storing said encrypted data in said memory external to said integrated circuit device in said network interface device.

The method may comprise receiving a nonce, encrypting said nonce with a second key stored in said network interface device, said second key being a private key associated with said network interface device and outputting said encrypted nonce.

The method may comprise executing a function with respect to at least a part of stored data, wherein said stored data is stored in one or more of said memory external to said integrated circuit device and memory on said integrated device.

The function may comprise a hash function.

An output of said function may be such that a size of said output of said function together with a size of said stored data is greater than a size of available memory for storing data.

An output of said function may have a size greater than a size of available memory for storing data.

An output of the function may be dependent on the content of said at least a part of said stored data.

The method may comprise receiving information identifying a location of stored data and using said information when execute said function with respect to said stored data at said location.

The information identifying a location may comprise comprises index information.

According to another aspect, there is provided a device comprising: an integrated circuit device comprising at least one processor and a first memory; and a second memory external to said integrated circuit device, wherein said integrated device is configured to execute a function with respect to at least a part of stored data, wherein said stored data is stored in one or more of said first memory and second memory on said integrated device.

According to another aspect, there is provided a method comprising: executing a function with respect to at least a part of stored data, wherein said stored data is stored in one or more of memory external to an integrated circuit device and memory on said integrated device.

The function may comprise a hash function.

An output of said function may be such that a size of said output of said function together with a size of said stored data is greater than a size of available memory for storing data.

An output of said function may have a size greater than a size of available memory for storing data.

An output of said function may be dependent on the content of said at least a part of said stored data.

The method may comprise receiving information identifying a location of stored data and using said information when execute said function with respect to said stored data at said location.

The information identifying a location may comprise index information.

The method may comprise outputting a result of said function.

According to another aspect, there is provided a device comprising:

a network interface device, said network interface device comprising an integrated circuit device comprising at least one processor and a first memory, an a second memory external to said integrated circuit device, wherein said integrated device is configured to execute a function with respect to at least a part of stored data, wherein said stored data is stored in one or more of said first memory and second memory on said integrated device.

The function may comprise a hash function.

An output of said function may be such that a size of said output of said function together with a size of said stored data is greater than a size of available memory for storing data.

An output of said function may have a size greater than a size of available memory for storing data.

An output of said function may be dependent on the content of said at least a part of said store data.

The integrated circuit device may be configured to receive information identifying a location of stored data and use said information to execute said function with respect to said stored data at said location, wherein said device is configured to provide said information.

The information identifying a location may comprise index information.

The integrated circuit device may be configured to output a result of said function and said device is configured to compare said received result with an expected result.

According to another aspect, there is provided a method comprising: providing one or more of firmware or a firmware update to one or more networking interface devices; and causing one or more integrity check values for said firmware of firmware update to be published, said integrity check values being dependent on storage of said firmware or firmware update in data storage in respective ones of said network interface devices.

A computer program comprising program code means adapted to perform the herein described methods may also be provided. In accordance with further embodiments apparatus and/or computer program product that can be embodied on a computer readable medium for providing at least one of the above methods is provided.

In the above, many different embodiments have been described. It should be appreciated that further embodiments may be provided by the combination of any two or more of the embodiments described above.

Various other aspects and further embodiments are also described in the following detailed description of examples embodying the invention and in the attached claims.

BRIEF DESCRIPTION OF DRAWINGS

Some embodiments will now be described by way of example only with reference to the accompanying Figures in which.

DETAILED DESCRIPTION OF EMBODIMENTS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 3:
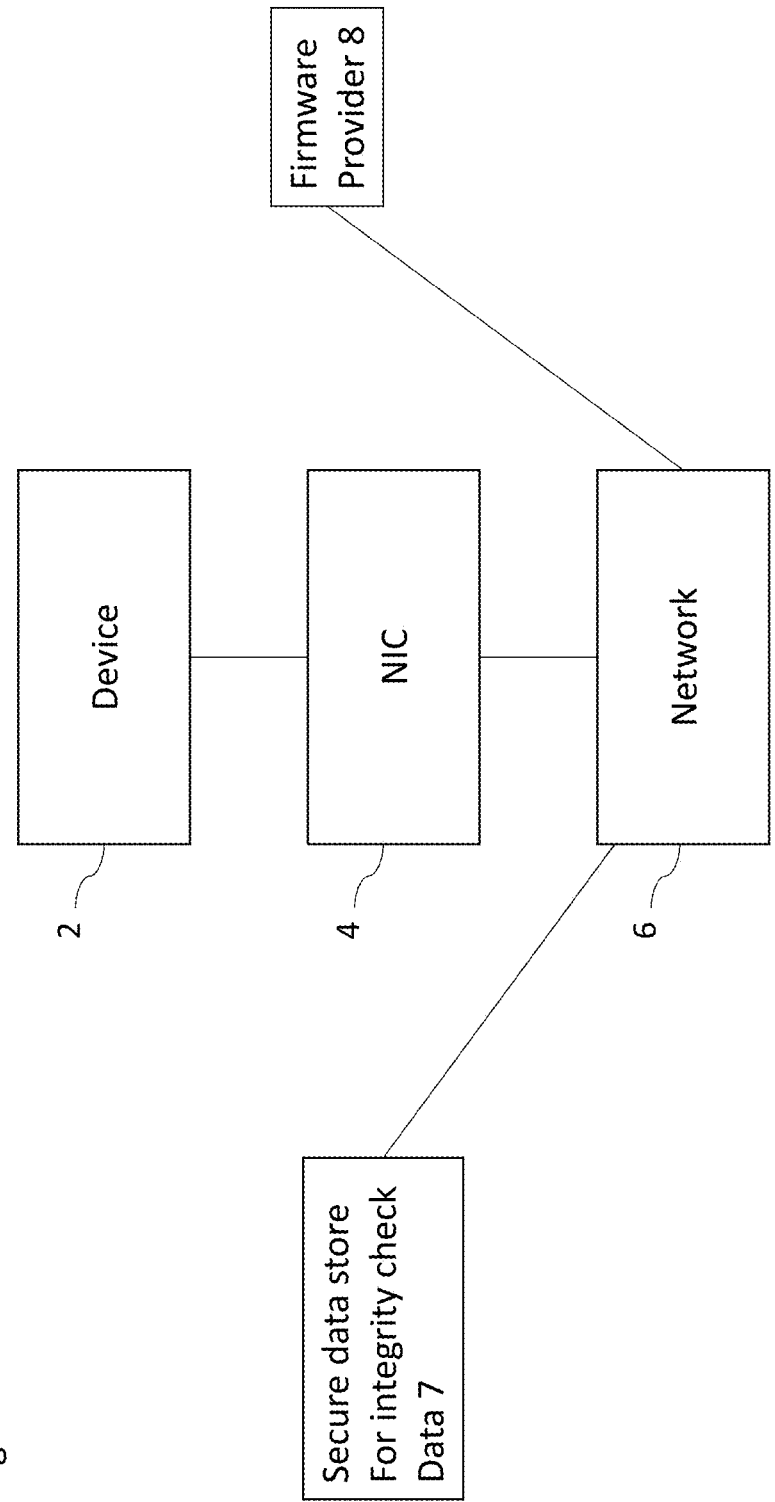
FIG. 3 shows an example architecture where embodiments may be provided.

Reference is made to FIG. 3 which schematically shows an arrangement where a device 2 such as a server is configured to communicate with a network 6 via a network interface device 4, sometimes referred to a NIC. The arrangement of FIG. 3 shows a firmware provider 8 which may provide firmware or firmware updates to the NIC. In some embodiments, more than one firmware provider may be provided. It should be appreciated that in other embodiments, firmware and firmware updates may not be provided via the network 6. A data store 7 is provided which may be used for checking the integrity of the firmware. This is described in more detail later.

A network interface device could be provided in any suitable form, including as a peripheral device or integrated with the hardware of a host data processing device. A device could be any kind of computer system, including a server, personal computer, or a bespoke processing unit.

A network interface device as described herein provides an interface to a network for use by its host data processing device. In this document, reference is made to a NIC. It should be appreciated that this NIC may be any suitable network interfacing device.

The NIC while logically a component of a device may be considered to be a physically separate and distinct piece of hardware and logically distinct network entity.

In some embodiments, the NIC may be implemented by a hardware device.

The NIC may be regarded as a gatekeeper between the device and the network, protecting the network from malicious or faulty devices and/or the devices from the network.

The NIC may be a party to network flows through the device. The NIC is able to monitor which application is communicating and to where. The NIC may be able to prevent undesirable flows from being established.

In some embodiments, the NIC may provide one or more of the following:

Monitoring and/or securing of network packets;

Provide a protected and/or tamper resistant execution domain;

Isolate and/or identify compromised devices;

Protect devices and/or data from network attack; and

Protect organizations from malicious operators.

Thus, it is desirable that a NIC be configured to only execute the firmware or computer code which is intended. This computer code may be the code which controls the underlying operation of the NIC and/or any specific applications which the NIC is to run and/or the code which controls for example which flows are monitored and/or the code which controls the processing of input/output packet flows. For example, the computer code may control a rule engine which provides a packet filtering or packet inspection function. The computer code may support a specific application of a user of the device of which the NIC is a part.

Thus the firmware may be any code which executes on the ASIC which defines the behavior of the NIC function and/or application code.

In the following, the term "firmware" is used and is intended to cover any one or more of these options described.

In some embodiments, the firmware may be partly or completely controlled by a vendor of the NIC. Of course, in other embodiments, the firmware may alternatively or additionally be controlled by one or more parties different to the vendor of the NIC.

In some situations, the release process of a vendor may have a firmware signing step where the firmware code and data or image is first hashed using a secure one way hash function (such as SHA 256) to form a hashed block of data. The contents of the block may be data and/or instructions. This block may be encrypted using a secret signing key. This secret signing key may be kept physically secure by the vendor.

The NIC, at manufacture time, may be programmed with a corresponding public key. During a firmware update process, the NIC receives new firmware as an image and stores this image in a persistent store such as flash memory. The image is downloaded. This may be via a utility running on the server or other device in which NIC is provided, or "over the air" via the network or in any other suitable manner. The NIC will still be running its previous known good firmware and will first compute for itself the hash of the firmware update. The NIC will then decrypt the signature of the firmware update using the public signing key and compare the results with the calculated hash. If the comparison is equal then the NIC firmware may deduce that the integrity of the firmware update is good in that the bits have not been corrupted during transit and that it was indeed released by the vendor. It may thus be assumed that the update satisfies the vendor's QA (quality assurance) process.

Firmware signing may improve the robustness of the product delivery flow. Firmware signing may provide some protection against malicious firmware, for example malware being applied in the field. Some examples of malware comprise viruses, worms, Trojan horses and spyware.

Some embodiments may provide an even more robust mechanism. The scope of firmware malware for damage is ever increasing. For example malware could modify data in transit which would be disadvantageous for a banking application. Malware could monitor application transfers or access and exfiltrate money and persistent state on a server.

It may be required that some types of updates and/or per customer customizations be released. It may be desirable to do those releases rapidly. For example it may be desirable to provide certain types of "fixes" to the firmware as soon as possible.

To support rapid releases, one or more NICs may exist outside of the vendor's manufacturing flow. Such NICs may be configured to accept non production signed firmware. These NICs are required for agile application development within the vendors own engineering activity and are sometimes referred to as "Engineering" NICs. These NICs may be used for testing purposes. During a fault investigation it may be required to iterate firmware with a customer. Such degraded NICs are generally configured not to check for production signed certificates on a firmware update. However such NICs may need to be tracked and/or identified. There may need to be a means to restore them robustly to production level in the field.

Thus to diagnose a field issue, a production NIC may be required to load non QA release firmware. This may be with the agreement of an end user. In some embodiments, a subsequent firmware update or release would restore the requirement to load only signed firmware. Some embodiments may ensure that should malware being installed while the non-release firmware is being run, this would be determined. Some embodiments which may address this issue are described in more detail later.

A customer may wish that only firmware images which have been tested through their own QA development flow be deployed. Some users/customers may have the ability to download their own programs onto the NICs themselves. For example, this may be an eBPF (extended Berkeley packet filter) or one or more complete applications. The authenticity and/or integrity of these downloaded programs may be ensured.

For many customers the physical location of the NIC may make inspection challenging.

Some NICs are deployed in data centers where there may be opportunities for tampering or even complete replacement of the physical hardware. A physical replacement NIC may appear to be reporting itself to the host operating system OS as usual, but is in fact be executing an arbitrary program in firmware, or indeed be an entirely different hardware design.

Some embodiments may provide one or more of the following features which may address or mitigate one or more of the above issues.

During manufacturing, at the time a serial number is created for a NIC, a unique public/private key pair for the NIC is also generated. The serial number of the NIC is preferable unique.

The private key component nic-priv is installed on the NIC. The public key component nic-pub is stored in a suitable database for future use.

Figure 4:
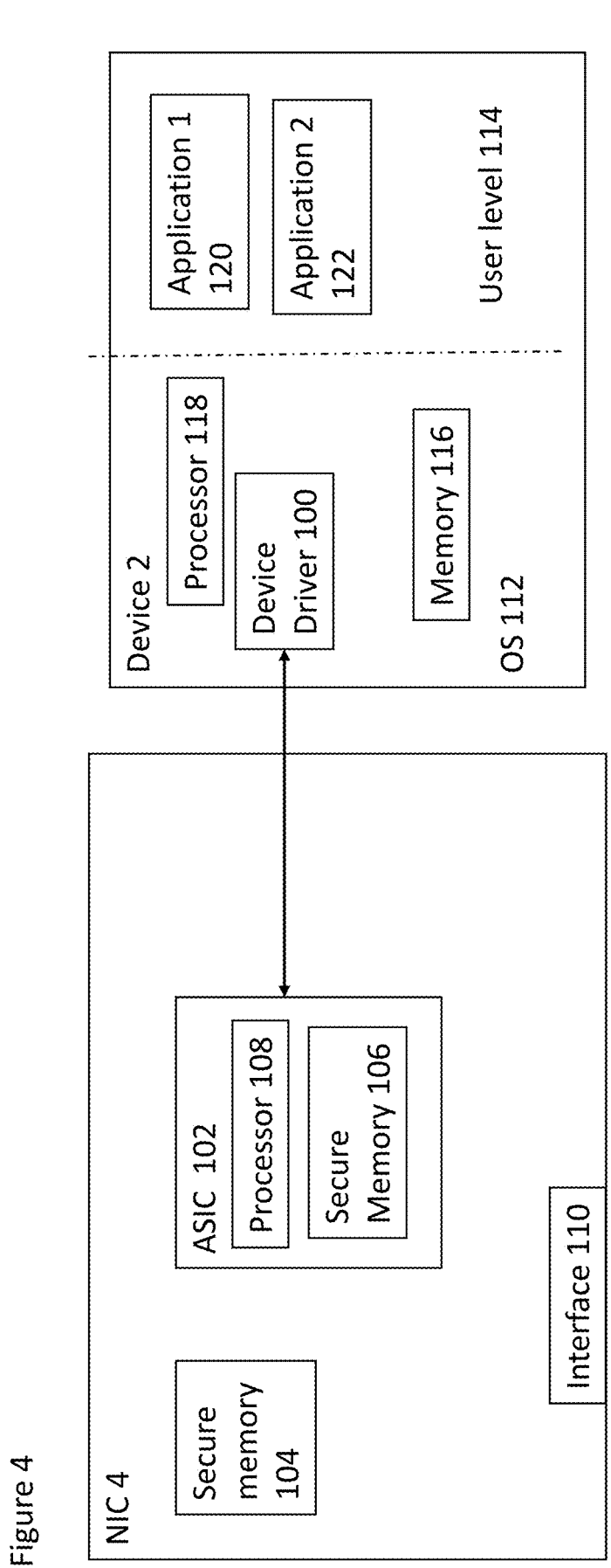
FIG. 4 shows a schematic example of a device having a NIC.

Reference is made to FIG. 4 which schematically shows the device 2 and the NIC 4. The NIC has an ASIC 102 (application specific integrated circuit). It should be appreciated that in other embodiments, the firmware may be alternatively or additionally be at least partly run and/or stored on any other suitable processing functionality such an FPGA (field programmable gate array), an integrated circuit die, an integrated circuit or the like.

In some embodiments, a plurality of processing entities may be provided.

The ASIC 102 or other suitable functionality comprises at least one processor 108 which is configured to execute at least some of the firmware, and at least one memory 106 which is configured to store at least some of the firmware code.

A further secure memory 104 is provided outside the secure memory. In some embodiments a plurality of further secure memories may be provided. In some embodiments, this further secure memory may be omitted if there is sufficient memory space in the ASIC or the like.

The NIC has an interface 110 which allows data to be received from and/or output to the network.

The device 2 has a device driver 100 for the NIC 4. The device may have an operating system OS part 112 operating at a higher level of privilege to a user level part 114. The device driver is provided in the OS part 112. The OS part 112 may comprise one or more processors. The OS part may comprise and/or have access to one or more memories 116.

The user level part 114 may support one or more user level applications. In the example shown in FIG. 4, the user level part supports a first application 120 and a second application 122.

Figure 1:
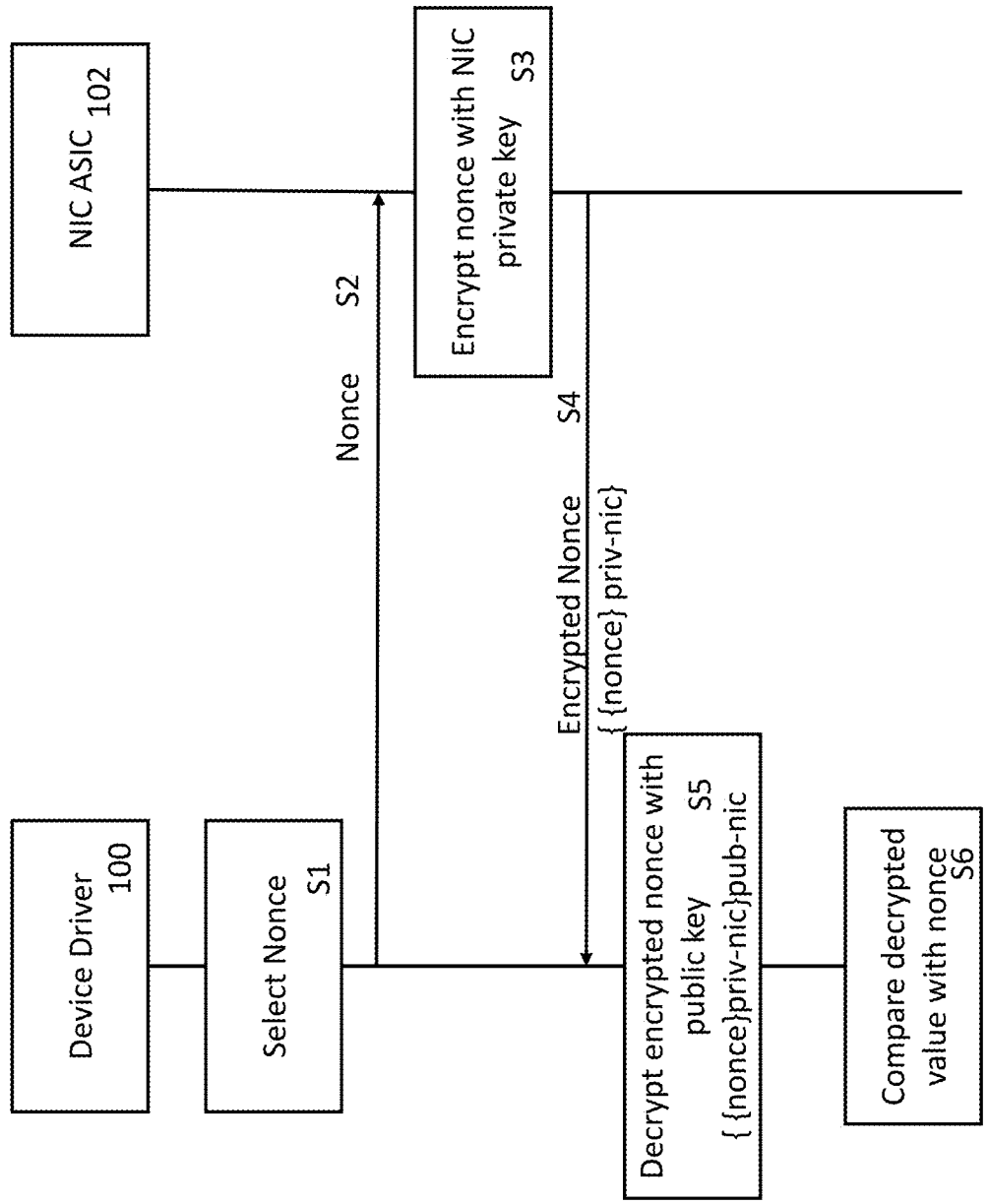
FIG. 1 shows a method of a first embodiment.

An example of a method will now be described with reference to FIG. 1. The example method of FIG. 1 allows the identity of a particular NIC to be identified. For example, at any time, the NIC firmware 102 may be issued with a challenge from say a device driver 100. Depending on the device, this may be done in one or more of the following ways:

Periodically; when there is a change in the firmware; in response to a request, in response to the occurrence of a particular event(s) in the NIC and/or the device, when the device is reset, when the device is powered down, when the device is powered up; when a link is dropped, and when a link is restored. Where a periodic check is made, this may for example be daily. Of course more frequent or less frequent checks may be made in some embodiments.

In step S1, the device driver picks a number at random (nonce).

In step S2, the device driver send the nonce to the NIC firmware in the ASIC.

In step S3, the NIC firmware encrypts the nonce using the NIC private key {nonce} priv-nic.

In step S4, the NIC firmware sends the encrypted nonce to the driver.

In step S5, the device driver decrypts the reply using the NICs public key.

In step S6, the device drive checks if the decrypted value is the sent nonce, that is {{nonce} priv-nic} pub-nic=nonce.

This challenge/response can be made by the driver, or via the network directly (such as an already encrypted control channel).

With the above steps in place, a NIC may now authenticate its identity.

To prevent the private key being copied out of a NIC, it is stored securely. In some embodiments, this private key is stored in the secure memory in the ASIC. In other embodiments, the private key may be stored in the secure memory outside the ASIC.

There are challenges since at least some of the NIC firmware and persistent state is generally stored in the secure memory 104 separate from the ASIC which executes the firmware. This secure memory may be flash memory or any other suitable non-volatile, secure memory. The persistent state may be one or more of the firmware instructions, default boot time configuration, IP address, link speed defaults, PCI (peripheral component interconnect) function settings, configuration information and state information which is not specific to the NIC. State information specific to the NIC such as one or more keys and NIC serial number is preferably but not necessarily stored in the secure memory in the ASIC.

To address this issue at the time of manufacture, an additional symmetric key sec-nic is generated. This key is unique for each NIC. In some embodiments, this key is a symmetric key. In preferred embodiments, this key is only used with the ASIC. This key is stored within the ASIC in the secure memory and used to encrypt, decrypt all access to the secure memory outside the ASIC during NIC operation.

Thus anything which is stored in the secure memory outside the ASIC is encrypted using the sec-nic key. The sec-nic key is preferably stored in the ASIC secure memory but in other embodiments may be stored in a further external secure memory. The firmware is configured such that it cannot access the sec-nic key itself but can only cause the sec-nic to be used to encrypt data written to the secure memory outside the ASIC and/or decrypt data read out of the secure memory outside the NIC. Therefore removal and inspection of the secure memory will not reveal the NIC's private key. A replacement of the secure memory contents cannot inject firmware or modify state such as the private key priv-nic which is stored in the secure memory.

In some embodiments, the value of sec-nic itself is never used outside of the ASIC. The production firmware and the ASIC itself may be designed to not reveal its value. This may be achieved through one or more of the following techniques:

a) Storage of the sec-nic key in a tamper resistant fuse data store (or non-volatile memory which is designed to obfuscate its contents even when probed with thermal imaging devices or other microscopic tools. Thus, in some embodiments, a separate secure store to the secure memory may be provided to store the sec-nic key.

b) Reduction of attack surface through a secure fuse which once blown during manufacturing process (for example after test of silicon is complete) will cause the isolation of all debug access, such as JTAG (Joint Test Action Group), to the ASIC which might allow diagnosis access to read out secured contents. For example there will be no JTAG access and/or no console and/or no NIC memory dump.

c) Isolation by hardware of the key values from firmware so that firmware executing on the ASIC cannot access the secret keys (one or other or both of the private key and the sec-nic key) and so prevent firmware from revealing the keys outside of the ASIC. In other words, the firmware can cause an encryption function to be performed using the respective key but may not be able to access the key itself (other than the encryption and/or decryption function). The encryption and/or decryption function would of course have access to the key. This value of this key may not be modified post manufacture of the NIC or the ASIC.

Figure 5:
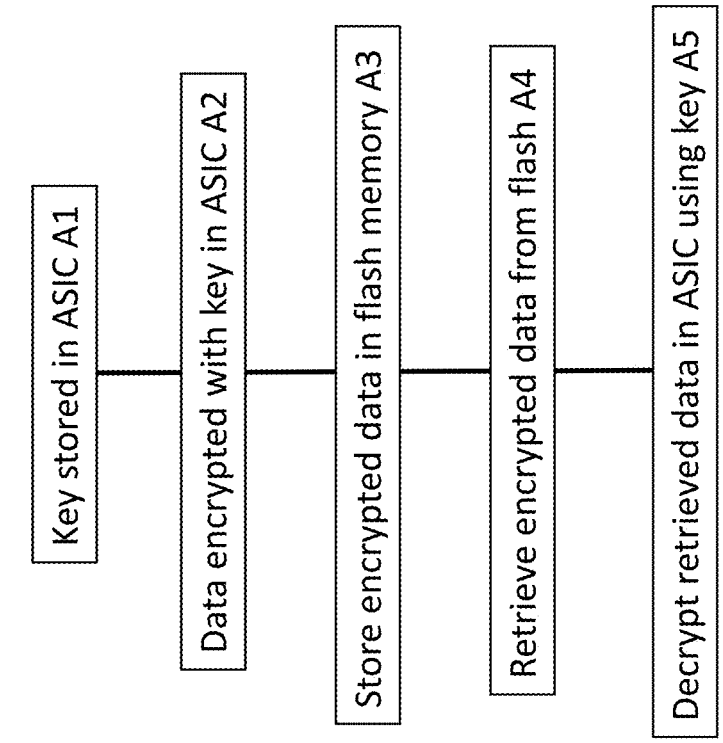
FIG. 5 shows a method of some embodiments.

Reference is made to FIG. 5 which schematically shows a method.

In a first step, A1, the sec-nic key is stored in the ASIC. This may be generated by the NIC during manufacture. The key may be a random key in some embodiments.

In step A2, the ASIC is configured to encrypt any data which is to be stored outside the ASIC with the key.

In step A3, the encrypted data is stored in the memory external to the flash.

In step A4, the encrypted data is retrieved by the ASIC as required from the memory external to the ASIC.

In step A5, the encrypted data is decrypted using the key in the ASIC.

This level of security may be useful in a number of different scenarios.

Some embodiments will now be described which provide some authenticity of firmware in the field. The previously described embodiments may have one or more tamper resistant features. These features may make it hard if not impossible to determine in the field whether a NIC is running firmware to which its purports because the contents of the ASIC, that is firmware image and/or state, are generally not designed to be revealed.

Consider the following scenario.

A firmware source which has passed its QA testing a system is to be used in a build. Such a NIC will have had one or more of the anti-tampering measures applied. As the system is being built and/or signed, malicious or corrupt code is injected. Malicious or corrupt code may be injected through faults in automated build systems or hacking activity such as might be undertaken by compromised employees. Failure in the field of such firmware would have serious business consequences for the vendor, made worse by the fact that the firmware had been signed as authentic and of production quality. In such a scenario, diagnosis and remedy of the compromised condition by the vendor may be very difficult or even not possible.

In some embodiments, the fact that the NIC contains a finite storage space 'S' is used. This finite storage space is the sum of the internal ASIC storage and the off chip non-volatile or secure memory. This finite storage space may be all the storage space or a part of the storage space which is available to firmware, excluding some areas which may be used for one or more keys, and/or boot code and/or the like. The finite storage space may be logically all the storage purpose for any purpose. The storage on the NIC may be logically addressed as an array S[N] of bytes, or as an array B[N/Block-size] of blocks.

Figure 2:
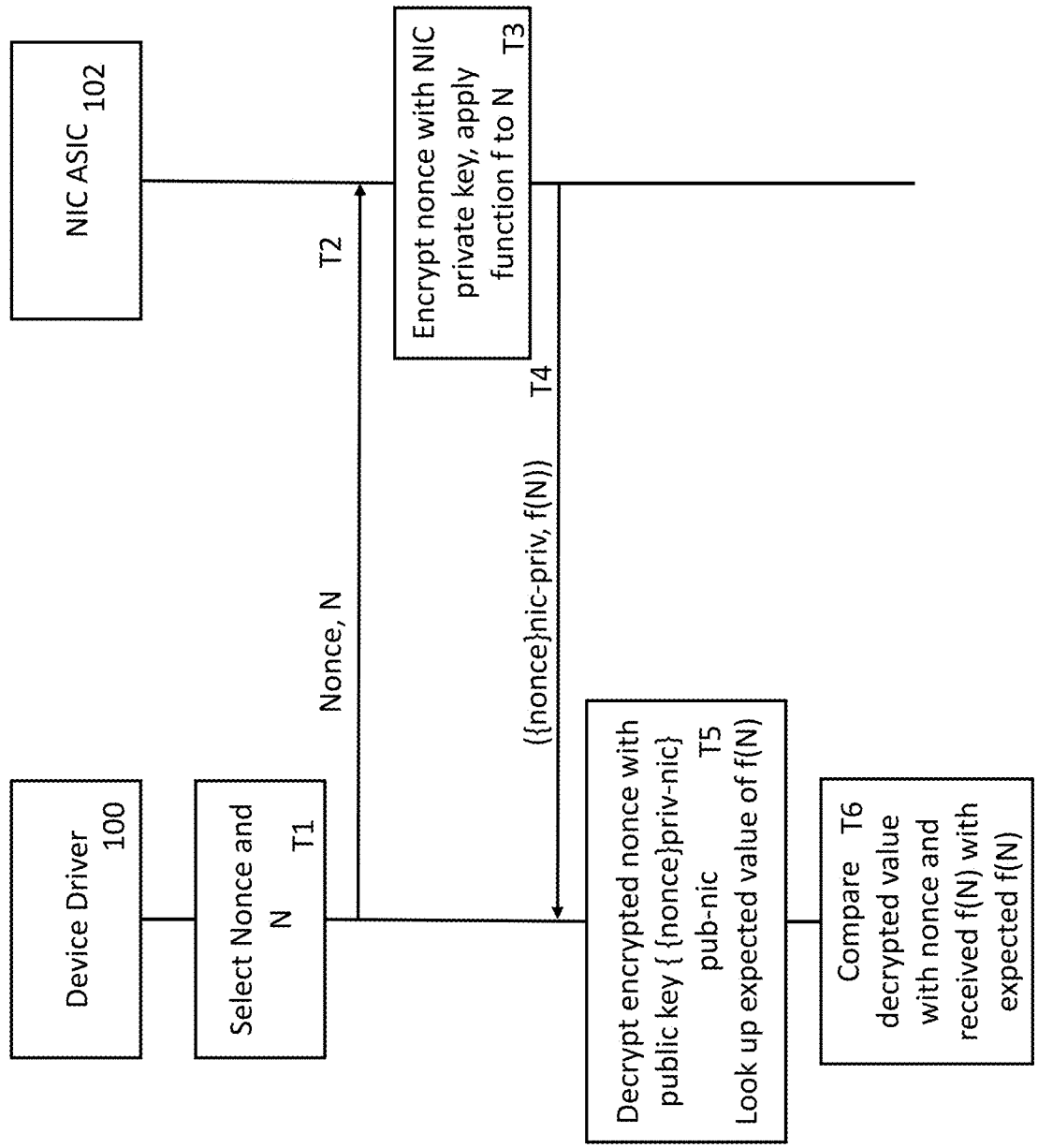
FIG. 2 shows a method of a second embodiment.

Reference is made to FIG. 2 which shows a method of another embodiment.

In step T1, the driver picks a number at random (nonce) and a value of N. N may be an index of the memory. For example, N may be byte index or block index. In some embodiments an index range may be selected. This may be selected at random in some embodiments. In other embodiments, a particular index or index range may be selected. In some embodiments, N may be incremented for every challenge.

In step T2, the device driver send the nonce to the NIC firmware along with the value of N.

In step T3, the NIC firmware encrypts the nonce using the NIC private key {nonce} priv-nic and applies the function f to the value N. The function may be a one way hash function.

The function f may have one or more of the following properties:

(i) The output of the function cannot be reduced to a size smaller than S;

(ii) The output of the function is depend upon the contents of S, defined by the index or index range;

(iii) The values of f may be pre-captured and published for every firmware release. The values may be provided in one or more of a utility, driver source code and escrow.

(iv) The values off shall not reveal the contents of the storage S. Thus f is a one-way-function.

A suitable function f would be a HMAC (hash based message authentication code) such as SHA 256 where f(N) is $SHA_{256}$ (S(N), S(N+Block size)) where block size is a suitable chunk of the storage such as 256 bytes The array f(N)=[f(1), f(2)111] is a sequence of hash values which may be stored outside of the ASIC.

Because the array f(N) is bigger than the size of S, it cannot be stored in the storage defined by the ASIC plus secure memory. Instead f(N) has to be calculated by the ASIC firmware at the time of challenge using the actual contents of S.

Therefore if the value of f(N) expected, for example given the vendor's build process, differs from the values returned by the NIC then the particular firmware integrity will be known to be broken.

Some embodiments may ensure that when firmware is downloaded, the available memory is always filled up at least to a certain extent. To ensure that this occurs, the firmware code may comprise padding bits to ensure that the allocated part of the memory is filled. This is to ensure that a copy of the correct firmware cannot be stored alongside rogue malware code.

This integrity check may be made at the point of driver load for example. This check may be performed repeatedly over the life span of the ASIC.

Figure 6:
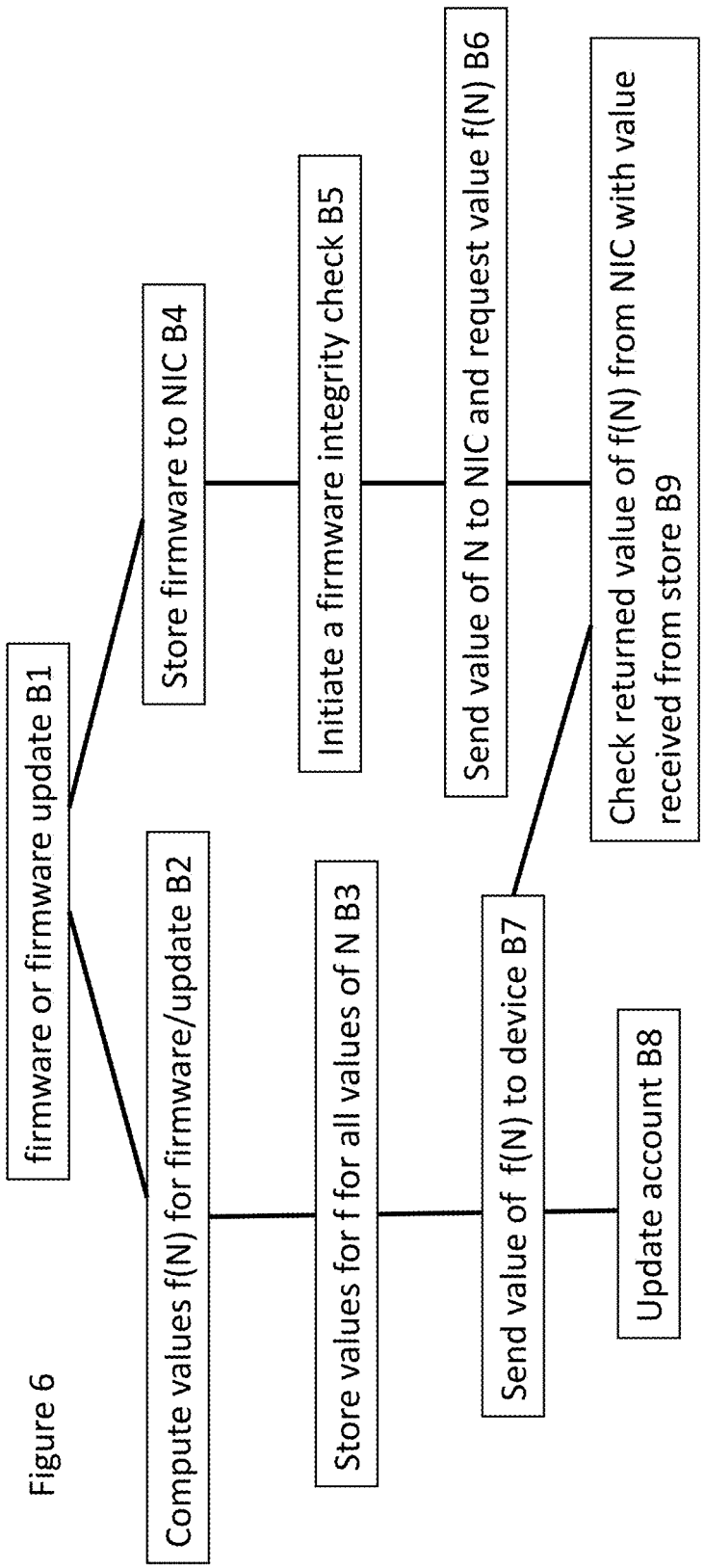
FIG. 6 shows a further method of some embodiments

It should be appreciated that in some embodiments, the method may be performed once for a particular integrity check. In other embodiments, the method may be performed a plurality of times, with different values of N to complete a particular integrity check, Reference is made to FIG. 6. In the step B1, the firmware or a firmware update is to be provided. This will be at the provider of that firmware. This may or may not be the same as the supplier or provider of the NIC.

In step B2, the firmware or firmware update is used to compute the reference values of the function f(N). This may be performed by the firmware provider itself or by an escrow party or the like.

In step B3, the values of f(N) for the firmware and/or firmware update are stored at a secure location. This may be in escrow, in some embodiments. In alternative embodiments, instead of storing the values of f(N), the values of f(N) may be computed by the secure location each time the values are required.

In step B4, the firmware or firmware update is stored in the NIC. This may be as discussed previously.

In step B5, a firmware integrity check is initiated. This integrity check may be as discussed previously.

In step B6, as part of the firmware integrity check, a value of N is selected (as previously discussed) and sent to the NIC. The value of f(N) is also requested from the secure store. In other embodiments, the device driver may have previously downloaded the values of f(N) prior to carrying out any integrity check. In some embodiments, the values of f(N) may be distributed to the device driver.

In step B7, the requested value of f(N) is sent from the secure store to the device driver.

In some embodiments, a user may be charged every time an integrity check value or set of values is required. In that scenario, the account of the user is updated in step B8. It should be appreciated that in other embodiments, a user may have a subscription and as part of that subscription is entitled to request and obtain the value of f(N) as required. In other embodiments, there may be no charge associated with this service.

In step B9, the device driver will check the returned value of f (N) from the NIC with the received value from the secure store. This process may allow that the firmware be constructed in a modular fashion. Each module[i] of firmware can be built in isolation and its integrity function fi(N) determined. As modules are layered through the final build the then final function f(N) is Σfi(N).

In some embodiments, changes between the output f(N) for different firmware builds can be expressed as the difference between the fi( ) functions for each module. This may reduce the attack surface or attack possibilities. This may allow stable modules f( ) output to be placed in escrow or the like. By expressing the final f( ) output as a sum of functions, only the changed fi( ) need to be updated when re-computing the sum after firmware has changed.

In some embodiments, f(N) values may be published. These values may be for the whole storage N or may be published as partial function fi( ) updates as firmware is updated.

In some embodiments, the host (driver) software may challenge the NIC by requesting the result of a particular f(N) function.

Alternatively, or additionally, a NIC can be challenged over the network. In one embodiment, the challenge may be in included in the API between the NIC and a controller software (this may be software used to set up firewall rules etc on the NIC).

In some embodiments, an online service or web-portal may be configured to issue challenges. This may remove the need for each driver/host to have the f( ) results for every possible firmware version. The challenge service may be called automatically by a utility running on the server (if the server is able to access the portal). Alternatively or additionally the challenge service may return a challenge string which is downloaded and ingested by the utility.

In some embodiments, different modules may be allocated different memory locations. The function may be performed for each memory location associated with a respective to provide an integrity check for the respective module. In some embodiments, one or more modules may be provided by one or more components of an embedded operation system and/or one or more application components. For example the embedded operating system modules may comprise one or more of a device driver, file system, network stack and/or the like. For example the application component modules may be one or more of a firewall and a web server. For example the component may be a program which is dynamically loaded by an operating system.

In some embodiments, all of the available memory has the function f applied to it. This may be done in a single operation. In other embodiments, the different parts of the memory may separately have the function f applied and the results may be summed to provide a single result. This summing may be performed in the device driver in some embodiments.

In some embodiments, this integrity check is performed prior to the any new firmware or updated firmware is run.

This decomposition allows security to source and binary to be applied on a module by module basis and finished modules to be placed in secure escrow. As new firmware features are developed, only affected modules are required to be rebuilt thus the attack surface is further reduced and it becomes less likely that a compromised employee can subvert the behaviour of the firmware because the amount of state that can be tampered with is further and further reduced.

Referring back to FIG. 2, in step T4, the NIC firmware sends the encrypted nonce to the driver along with the function f applied to the value N.

In step T5, the device driver decrypts the encrypted nonce using the NICs public key and looks up or otherwise obtains the expected value of f(N).

In step T6, the device drive checks if the decrypted value is the sent nonce, that is {{nonce} priv-nic} pub-nic=nonce and that the expected value of f(N) has been received.

In one modification, one or more of the above mentioned techniques may be used with a customer or end user.

A customer may be allowed to register their signing key with the NIC. This may implemented by the NIC allowing the customer to sign the vendor's public signing certificate. NIC firmware would therefore further allow customer signed firmware i.e. firmware signed by both customer and the vendor to be applied.

In some embodiments, where complex dynamic programs such as applications or code fragments (such as eBPF) are downloaded, they may be treated as build products and added to the firmware hash f function. Therefore the NIC may be challenged after installation to prove the integrity and authenticity both of its hardware identity and firmware contents and/or state.

Thus some embodiments, the firmware is hardened to prevent it doing anything that the firmware is not supposed to. It should be appreciated that some embodiments still allow bugs or updates to be provided. However, in some embodiments, customers or the like may not be permitted to access functions that might give access to private data that should remain secured.

In some embodiments, the firmware and software may be signed.

A signature is attached to the file. This may be using an appropriate industry-standard cryptographic technique.

The signature may be in the form of a long string of alpha-numeric characters that is calculated mathematically based on a number of factors The signature may depend on the content of the firmware so that it can be determined if anything is changed. For example, it may be determined if the firmware image has been tampered with.

The signature may be dependent on a private key as previously discussed and can be checked against a public key that can be published.

Some embodiments may ensure that only the correct firmware is installed on an NIC at production.

Some embodiments may ensure that there is no unauthorised uploading of firmware.

Some embodiments may be such that the provenance of the NIC may be proved to a purchaser or the like of the NIC.

Some embodiments may provide a signature certificate on the NIC, associated with its MAC address, which proves the provenance of a specific NIC.

During a manufacturing process test, once a NIC has passed, it will be made secure.

Bits in the ASIC fuse block will be blown which may:
Prevent the ASIC from booting anything other than signed firmware; and/or
Prevent certain JTAG operations, e.g. flash access.

Next, a certificate and key-pair will be programmed onto the NIC which will allow a customer to verify the NIC.

The Certificate/Key-pair match the NIC's MAC Address in some embodiments.

It should be appreciated that memories of the NIC may be programmed with static and dynamic configuration partitions. In some embodiments, the dynamic partitions may contain variables changed by the executing firmware. For example a dynamic partition may comprise one or more log-files or the like. A static partition may contain items which rarely or never change such as serial number and/or the like.

It should be appreciated that various information may be securely stored in one or other of both of the memory in the ASIC or the secure memory outside the ASIC. For example the information may be stored in a private partition of a memory. This information may be signed with the sec-nic key or encrypted with the sec-nic. The information may comprise one or more of:

Unique licensing ID (MAC address);
One or more different license validation public key;
On or more respective license challenge-response private key;
One or more license validation certificate; and
One or more licensing certificate authority.

In some embodiments, the NIC may implement the functions of a trusted platform module TPM. A trusted platform module may provide a tamper-resistant integrated circuit that can perform cryptographic operations (including key generation) and protect sensitive information, such as passwords, cryptographic keys and/or the like.

In some embodiments, a secure bootloader implemented completely within the local state of the ASIC may be provide which is designed to be part of the trusted platform module provided the NIC. The secure bootloader may establish a root of measurement trust, so that the NIC can assure itself that the firmware and applications which it knows about are all correct. This may be in addition to the NIC firmware verifying the signatures of any new code which it receives—for example an upgrade.

In the field, the user needs to be able to trust the NIC (and the NIC vendor) to be implementing this trusted platform/root of trust correctly.

In some embodiments, the output of all the hash functions combined is much larger than all the state contained on the device, such as previously described.

All the static state may be covered. For example any free space in for example the flash memory or secure memory is set to include random numbers. These may be true random numbers rather than pseudo random numbers which might be calculated.

All dynamic state (for example run time variables which may be changing as firmware is being executed) may be kept by hardware design separate to the static state.

It should be appreciated that given the existence of dynamic state, an attack might be to provide malicious code which patches to locations $\{X\}$. The original code is stored in memory which is reserved for dynamic state. If a measurement request is made for any location within $\{X\}$ then the unpatched code can be included in the hash calculation.

However, in some embodiments this attack can be prevented. The entry point for the execution for f (the authentication hash) being implemented is within the secure trusted platform module so that (without redesigning the hardware itself) it is not possible for an unpatch operation to be made during the invocation of f. In other words the boot code for running the function f(N) is provided in the TPM Some embodiments which do not provide a TPM may have applications as they may restrict the total amount of state that can be modified without detection and so may reduce the scope/functionality of any breach.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A network interface device comprising:
an integrated circuit device comprising at least one processor; and
at least one memory comprising:
a first memory area for storing computer code instructions comprising operations performable by the at least one processor;

a second memory area for storing dynamic state comprising run time variables updated in response to execution of the computer code instructions in the first memory area, wherein the first memory area is partitioned from the second memory area, wherein said integrated circuit device is configured to execute a hash function over at least some of the computer code instructions in the first memory area; and wherein said integrated circuit device comprises a resistant part configured to store code associated said hash function.

2. A network interface device as claimed in claim 1, wherein said at least one memory comprises at least one of a first memory in said integrated circuit and a second memory external to said integrated circuit device.

3. A network interface device as claimed in claim 1, wherein an output of said hash function is such that said hash function is calculated by said processor using the computer code instructions.

4. A network interface device as claimed in claim 1, wherein an output of said hash function is such that a size of said output of said hash function together with a size of said stored computer code instructions is greater than a size of available memory for storing data.

5. A network interface device as claimed in claim 1, wherein an output of said hash function has a size greater than a size of available memory for storing data.

6. A network interface device as claimed in claim 1, wherein an output of said hash function is dependent on content of said at least a part of said computer code instructions.

7. A network interface device as claimed in claim 1, wherein said integrated circuit device is configured to receive information identifying at least part of the first memory area and use said information to execute said hash function with respect to stored data in said at least part of the first memory area.

8. A network interface device as claimed in claim 7, wherein said information identifying a location comprises index information.

9. A network interface device as claimed in claim 1, wherein said integrated circuit device is configured to output a result of said hash function.

10. A network interface device as claimed in claim 2, comprising in said integrated circuit device a data store configured to store a first encryption key, said at least one processor is configured to encrypt data to be stored in said second memory using said first encryption key.

11. A network interface device as claimed in claim 10, wherein said data store is provided by said first memory.

12. A network interface device as claimed in claim 10, wherein said data store is a fuse data store.

13. A network interface device as claimed in claim 10, wherein said integrated circuit device is such that debug access is unavailable.

14. A network interface device as claimed in claim 10, wherein integrated circuit device is such that at least some computer code executing on said at least one processor is unable to directly read said first encryption key.

15. A network interface device as claimed in claim 1, wherein said integrated circuit device comprises at least one of an ASIC, an FPGA, an integrated circuit and an integrated circuit die.

16. A network interface device as claimed in claim 10, wherein a second key is provided in said network interface device, said second key being a private key associated with said network interface device.

17. A network interface device as claimed in claim 16, wherein said second key is stored in one of said data store, the first memory and the second memory.

18. A network interface device as claimed in claim 16, wherein said network interface device is configured to receive a nonce, the integrated circuit device is configured to encrypt the nonce with said second key and output said encrypted nonce.

19. A method of storing code in a memory of an integrated circuit device, by at least one processor, the method comprising:

storing in a first memory area of the memory, computer code instructions comprising operations performable by the at least one processor;

storing in a second memory area of the memory, a dynamic state comprising run time variables updated in response to execution of the computer code instructions in the first memory area, wherein the first memory area is partitioned from the second memory area;

executing by the at least one processor, a hash function over at least some of the computer code instructions in the first memory area; and storing code associated with said hash function in a resistant part of said integrated circuit device.

20. A method as claimed in claim 19, wherein an output of said hash function is such that a size of said output of said hash function together with a size of said computer code instructions as stored is greater than a size of available memory for storing data.

21. A method as claimed in claim 19, wherein an output of said hash function has a size greater than a size of available memory for storing data.

22. A method as claimed in claim 19, wherein an output of said hash function is dependent on content of said at least a part of said computer code instructions.

23. A method as claimed in claim 19, comprising receiving information identifying at least part of the first memory area and using said information when executing said hash function with respect to stored data in said at least part of the first memory area.

24. A method as claimed in claim 23, wherein said information identifying a location comprises index information.

25. A method as claimed in claim 19, comprising outputting a result of said function.

26. A device comprising:

a network interface device, said network interface device comprising:

an integrated circuit device comprising at least one processor; and at least one memory comprising:

a first memory that is part of the integrated circuit device; and a second memory external to said integrated circuit device, wherein the at least one memory comprises:

a first memory area for storing computer code instructions comprising operations performable by the at least one processor;

a second memory area for storing dynamic state comprising run time variables updated in response to execution of the computer code instructions in the first memory area, wherein the first memory area is partitioned from the second memory area;

wherein said integrated circuit device is configured to execute a hash function over at least some of the computer code instructions in the first memory area; and wherein said integrated circuit device comprises a resistant part, said resistant part being configured to store code associated with said hash function.

27. A device as claimed in claim 26, wherein said function comprises a hash function.

28. A device as claimed in claim 26, wherein an output of said hash function is such that a size of said output of said function together with a size of said stored computer code instructions is greater than a size of available memory for storing data.

29. A device as claimed in claim 26, wherein an output of said hash function has a size greater than a size of available memory for storing data.

30. A device as claimed in claim 26, wherein an output of said hash function is dependent on content of said at least a part of said computer code instructions.

31. A device as claimed in claim 26, wherein said integrated circuit device is configured to receive information identifying at least part of the first memory area and use said information to execute said hash function with respect to stored data in said at least part of the first memory area.

32. A device as claimed in claim 31, wherein said information identifying a location comprises index information.

33. A device as claimed in claim 32, wherein said integrated circuit device is configured to output a result of said hash function and said device is configured to compare said received result with an expected result.

34. A network interface device as claimed in claim 1, wherein the resistant part comprises a tamper proof module function, said tamper proof module function being configured to store boot code for said function.

* * * * *